United States Patent
Smith et al.

[11] Patent Number: 5,289,934
[45] Date of Patent: Mar. 1, 1994

[54] ADJUSTABLE MOUNTING ASSEMBLY FOR ELECTRICAL OUTLET BOX

[76] Inventors: Benjamin H. Smith, Bingen; Scott P. Pimley, Lyle, both of Wash.

[21] Appl. No.: 114,937

[22] Filed: Sep. 2, 1993

[51] Int. Cl.$^5$ .............................................. H02G 3/12
[52] U.S. Cl. ..................................... 220/3.7; 220/3.9; 220/3.92; 248/224.2; 248/906
[58] Field of Search ................... 248/906, 298, 224.2, 248/224.4; 220/3.2, 3.3, 3.5, 3.7, 3.9, 3.92, 476, 477

[56] References Cited

U.S. PATENT DOCUMENTS

| | | | |
|---|---|---|---|
| 916,436 | 3/1909 | Greenfield | 248/906 |
| 1,775,665 | 9/1930 | Behm | 248/906 |
| 2,272,846 | 2/1942 | Lindstrom | 248/906 |
| 2,531,698 | 11/1950 | Petrick et al. | 220/3.7 |
| 3,289,852 | 12/1966 | Kahn | 248/224.2 |
| 3,365,156 | 1/1968 | Beck | 248/224.2 |
| 3,834,658 | 9/1974 | Theodorides | 248/906 |
| 4,062,470 | 12/1977 | Boteler . | |
| 4,417,373 | 11/1983 | Keaglewitsch | 248/224.2 |
| 4,634,015 | 1/1987 | Taylor | 220/3.7 |
| 4,747,506 | 5/1988 | Stuchlik, III . | |
| 4,971,280 | 11/1990 | Rinderer | 248/906 |

Primary Examiner—Allan N. Shoap
Assistant Examiner—S. Castellano
Attorney, Agent, or Firm—Brady, O'Boyle & Gates

[57] ABSTRACT

An adjustable mounting assembly for an electrical outlet box wherein a bracket is secured to a wall stud. One face of the bracket has a tongue having an axially extending threaded bore. A side wall of the outlet box has a longitudinally extending groove which receives the bracket tongue so that the box is slidably mounted on the bracket for movement forwardly and rearwardly relative to the wall stud. An adjustment bolt extends longitudinally of the groove and into a threaded bore in the tongue whereby an unlimited adjustment of the electrical box is obtainable so that the front of the box will be flush with the subsequently applied plaster or dry wall and paneling. The bolt not only functions during the adjustment of the box but also, once the desired adjusted position is obtained, it functions as a stop member to hold the box at the adjusted position.

7 Claims, 2 Drawing Sheets

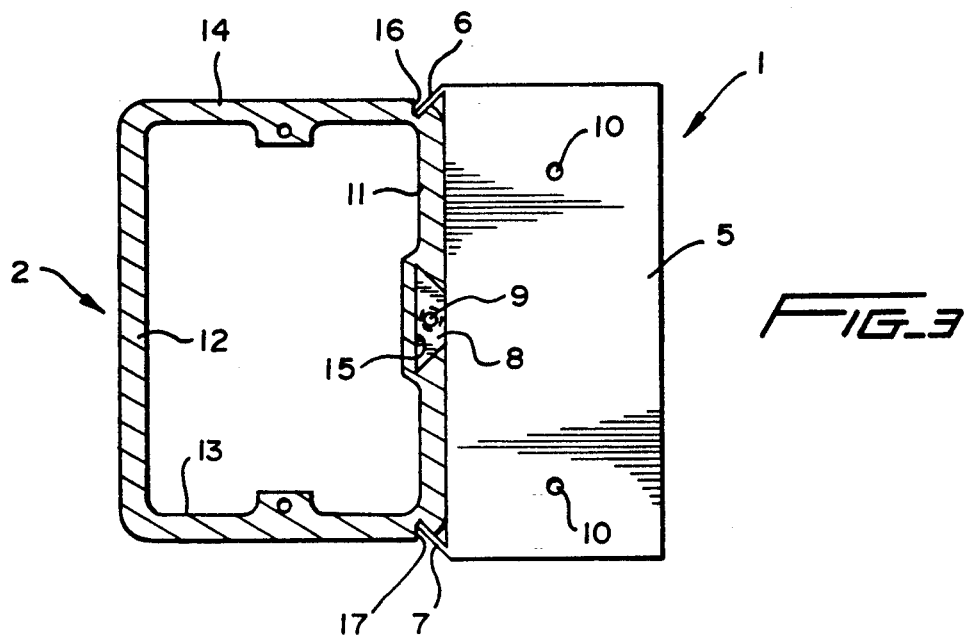
FIG_3
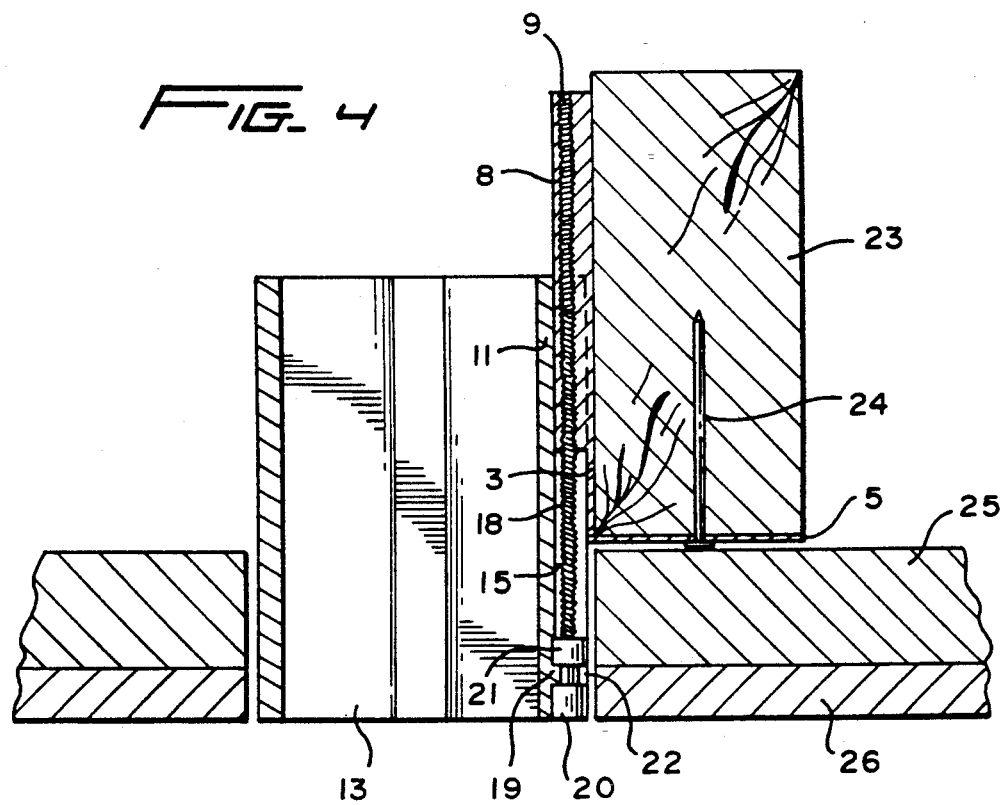
FIG_4 ations for electrical outlet box

BACKGROUND OF THE INVENTION

Adjustable mounting assemblies for electrical outlet boxes have been proposed wherein the outlet box is slidably mounted on a bracket secured to a wall stud, whereby the outlet box is adjustable so that the front of the box will be flush with respect to the subsequently applied dry wall or paneling.

Such an assembly is disclosed in U.S. Pat. No. 4,747,506 dated May 31, 1988, which has been satisfactory for its intended purpose; however, the adjustability of the box is limited by stop members provided between the outlet box and bracket which limit the forward and rearward movement of the box relative to the wall stud and associated mounting bracket.

After considerable research and experimentation, the adjustable mounting assembly of the present invention has been devised as an improvement over known adjustable mounting assemblies in that the adjustable mounting assembly is constructed and arranged without stop members to thereby provide an unlimited adjustment of the outlet box.

SUMMARY OF THE INVENTION

The adjustable mounting assembly for an electrical outlet box of the present invention comprises, essentially, a bracket adapted to be fastened to a wall stud. One face of the bracket is provided with a longitudinally extending tongue having an axially extending threaded bore formed therein. A side wall of the electrical outlet box is provided with a longitudinally extending groove adapted to receive the tongue on the bracket, whereby the box is slidably mounted on the bracket for movement forwardly and rearwardly relative to the wall stud. The side wall of the electrical outlet box is provided with a longitudinally extending bolt which extends through the box groove and into the threaded bore of the bracket tongue, whereby the position of the box relative to the wall stud can be adjusted by turning the bolt to thereby slide the box relative to the bracket.

By this construction and arrangement, the bolt and associated tongue and groove cooperate whereby an unlimited adjustment of the electrical outlet box is obtainable. The bolt not only functions during the adjustment of the box but also, once the desired adjusted position is obtained, it functions as a stop member to hold the box at the adjusted position.

BRIEF DESCRIPTION OF THE DRAWINGS

FIG. 3 is an end elevational view, partly in section, showing the electrical outlet box and associated mounting bracket; and FIG. 4 is a sectional, top plan view showing the outlet box and associated mounting bracket connected to a wall stud, with the box being adjusted to accommodate a particular wall thickness.

DESCRIPTION OF THE PREFERRED EMBODIMENT

Figure 1:
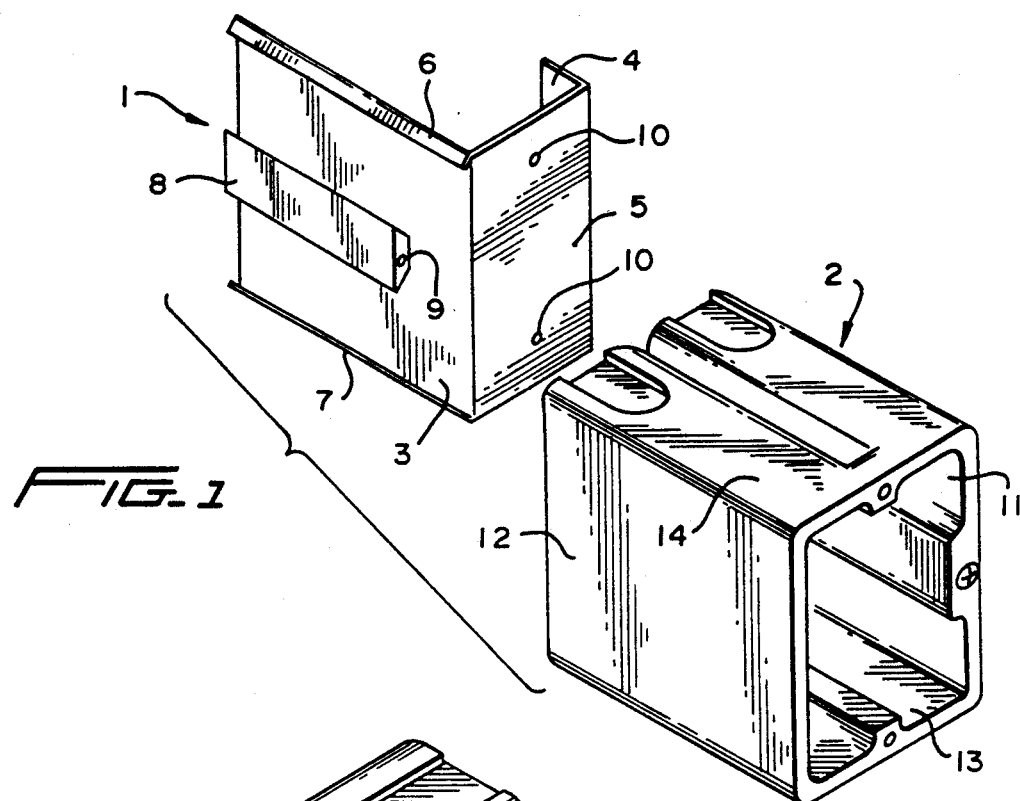
FIG. 1 is an exploded perspective view of the electrical outlet box and mounting bracket of the present invention.
Figure 2:
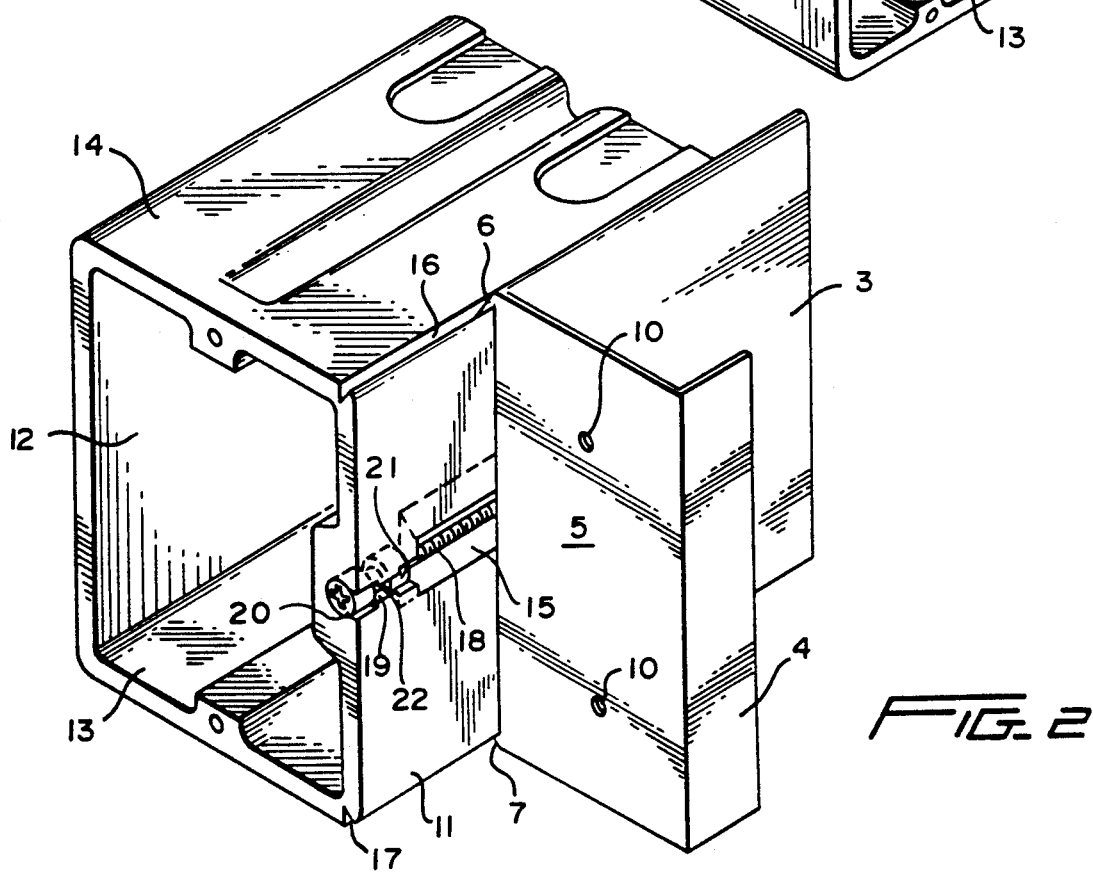
FIG. 2 is a perspective view of the electrical outlet box connected to the mounting bracket.

Referring to the drawings and more particularly to FIGS. 1 and 2, the adjustable mounting assembly of the present invention comprises a bracket 1 upon which an electrical outlet box 2 is adapted to be slidably mounted. The bracket 1 comprises a sheet of metal bent to provide a pair of spaced, parallel, longitudinally extending side walls 3 and 4 interconnected at one end by a transversely extending end wall 5. The upper edge of side wall 3 is provided with a downwardly extending flange portion 6 and the lower edge of the side wall is similarly provided with an upwardly extending flange portion 7. The bracket side wall 3 is also provided with a longitudinally extending tongue 8 extending outwardly from the face of side wall 3, and having a longitudinally extending threaded bore 9 formed therein.

To complete the structure of the bracket 1, a pair of nail holes 10 are provided in the bracket end wall for securing the bracket 1 to a wall stud, to be described more fully hereinafter.

The electrical outlet box 2 comprises a molded plastic housing having side walls 11 and 12, a bottom wall 13 and a top wall 14. The side wall 11 is provided with a longitudinally extending groove 15 having a cross-sectional configuration corresponding to the bracket tongue 8, as will be seen in FIG. 4. The upper and lower exterior corners of the housing adjacent wall 11 are provided with longitudinally extending grooves 16 and 17 for receiving bracket flange portions 6 and 7, respectively.

To connect the box 2 to the bracket 1, the flanges 6 and 7 on the bracket 1 are axially aligned with the respective grooves 16 and 17 on the box, and the tongue 8 is axially aligned with the box groove 15 and the box is slid onto the bracket. In order to slide the box 2 relative to the bracket 1 to an adjusted position, a bolt 18 is provided which is mounted on the box side wall 11 and extends longitudinally through the groove 15 and into the threaded bore 9. The bolt 18 is held on the box side wall 11 by an annular shoulder 19 positioned between the bolt head 20 and a collar 21 integral with the bolt 18. The annular shoulder 19 is split as at 22 so that the bolt 18 can be inserted laterally into the groove 15 with the bolt head 20 and collar 21 being snapped into position on opposite sides of the annular shoulder 19.

Referring to FIG. 4, in use the mounting bracket 1 and associated electrical outlet box 2 are fastened to a wall stud 23 by nails 24 extending through the nail holes 10 in the bracket end wall 5. The position of the outlet box 2 is adjusted by turning bolt 18 so that the front of the box 2 will be flush with the subsequently applied plaster or dry wall 25 and paneling 26.

From the above description, it will be readily appreciated by those skilled in the art that the adjustable mounting assembly of the present invention is an improvement over heretofore employed adjustable mounting assemblies for electrical outlet boxes in that the cooperating tongue and groove connections 6,16; 7,17; and 8,15 between the bracket 1 and box 2, and the associated adjusting bolt 18 provide for an unlimited adjustment of the box 2 relative to the wall stud 23, and that the bolt 18 not only functions during the adjustment of the box 2 but also functions as a stop member to hold the box 2 at the desired adjusted position.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. An adjustable mounting assembly for an electrical outlet comprising, a bracket, said bracket having one portion fastened to a wall stud, said bracket having a second portion, a tongue secured to said second portion, a threaded bore provided in said tongue, a rectangular electrical outlet box having side walls, a bottom wall and a top wall, a groove provided in one of the side walls of said box, said bracket tongue being slidably mounted in said groove, and said bracket tongue being completely enclosed within said groove, wherein the electrical box slides relative to said wall stud, and a bolt carried on said one side wall of said box, said bolt extending into said threaded bore in said tongue, whereby the position of the electrical outlet box is adjusted relative to the wall stud to thereby position a front of the box flush with a surface of a wall in which the box is mounted.

2. An adjustable mounting assembly according to claim 1, wherein the bracket comprises a sheet of metal bent to provide a pair of spaced, parallel longitudinally extending side walls having upper edges and lower edges, an end wall extending transversely to each side wall and integral with corresponding sides of said side walls, said end wall being fastened to said wall stud, said tongue being fastened to one of said side walls and extending longitudinally therewith, and said threaded bore extending longitudinally within said tongue.

3. An adjustable mounting assembly according to claim 2, wherein a downwardly extending flange portion is provided at the upper edge of said one side wall of said bracket, an upwardly extending flange portion provided at the lower edge of said one side wall of said bracket, two additional, upper and lower longitudinally extending grooves provided in upper and lower exterior corners respective of said electrical box adjacent said one side wall of said box, said upper and lower longitudinally extending grooves receiving said upper and lower flange portions respectively.

4. An adjustable mounting assembly according to claim 2, wherein the groove in the box side wall extends longitudinally thereof in alignment with the longitudinally extending tongue, the cross-sectional configuration of said tongue corresponding to the cross-sectional configuration of said groove.

5. An adjustable mounting assembly according to claim 4, wherein the bolt extends longitudinally through the groove and into the longitudinally extending threaded bore.

6. An adjustable mounting assembly according to claim 5, wherein the bolt is provided with a head and an integral collar spaced inwardly of said bolt head, an annular shoulder being integral with said one side wall of said electrical box adjacent one end of said groove, said annular shoulder being positioned in a bolt space between the bolt head and collar, whereby the bolt is held onto said one side wall of said electrical box.

7. An adjustable mounting assembly according to claim 6, wherein the annular shoulder is split, whereby the bolt can be inserted laterally with the bolt head and collar being snapped into position on opposite sides of the annular shoulder.

* * * * *